(12) United States Patent
Oogaki

(10) Patent No.: US 7,892,998 B2
(45) Date of Patent: Feb. 22, 2011

(54) OPTICAL GLASS AND OPTICAL ELEMENT

(75) Inventor: Akio Oogaki, Hyogo (JP)

(73) Assignee: Konica Minolta Opto, Inc., Tokyo (JP)

( * ) Notice: Subject to any disclaimer, the term of this patent is extended or adjusted under 35 U.S.C. 154(b) by 43 days.

(21) Appl. No.: 12/247,613

(22) Filed: Oct. 8, 2008

(65) Prior Publication Data

US 2009/0097146 A1   Apr. 16, 2009

(30) Foreign Application Priority Data

Oct. 15, 2007   (JP) .............................. 2007-267627

(51) Int. Cl.
*C03C 3/21* (2006.01)

(52) U.S. Cl. ....................................................... 501/46

(58) Field of Classification Search .................... 501/46
See application file for complete search history.

(56) References Cited

U.S. PATENT DOCUMENTS

| | | | | |
|---|---|---|---|---|
| 3,836,375 A | * | 9/1974 | Broemer et al. | 501/46 |
| 4,261,751 A | * | 4/1981 | Nakamura et al. | 501/42 |
| 4,996,173 A | * | 2/1991 | Tachiwana | 501/73 |
| 7,501,366 B2 | * | 3/2009 | Wolff et al. | 501/45 |
| 7,638,448 B2 | * | 12/2009 | Wolff et al. | 501/45 |
| 2006/0058171 A1 | | 3/2006 | Izuki | |
| 2007/0225146 A1 | * | 9/2007 | Wolff et al. | 501/46 |
| 2008/0039309 A1 | * | 2/2008 | Wolff et al. | 501/46 |

FOREIGN PATENT DOCUMENTS

| | | | |
|---|---|---|---|
| JP | 71003462 | * | 1/1971 |
| JP | 2005306733 | | 11/2005 |
| JP | 2006131480 | | 5/2006 |
| JP | 2007254280 | * | 10/2007 |

* cited by examiner

*Primary Examiner*—Karl E Group
(74) *Attorney, Agent, or Firm*—Lucas & Mercanti, LLP

(57) ABSTRACT

An optical glass includes, based on a total weight of the optical glass: 15 to 40 weight percent of $P_2O_5$; 0 to 10 weight percent of $Li_2O$; 0 to 20 weight percent of $Na_2O$; 0 to 20 weight percent of $K_2O$; more than 2 weight percent and not more than 15 weight percent of $TiO_2$; 0 to 15 weight percent of CaO; 0 to 32 weight percent of BaO; 0 to 20 weight percent of SrO; 0 to 15 weight percent of ZnO, not less than 0 weight percent and less than 3 weight percent of $Bi_2O_3$; 0 to 50 weight percent of $Nb_2O_5$; not less than 0 weight percent and less than 20 weight percent of $WO_3$; and 0 to 1 weight percent of $Sb_2O_3$. A total weight of $Li_2O$, $Na_2O$ and $K_2O$ is in a predetermined range of weight percents and the optical glass does not comprise $B_2O_3$.

5 Claims, 1 Drawing Sheet a temperature near the glass transition temperature Tg of the glass in the direct press method. Consequently, the degradation of the mold is easily accelerated and the life time of the mold is shortened when the yield temperature At or the glass transition temperature Tg of the glass is higher, which results in increase of the cost. Therefore, an optical glass having the yield temperature At or the glass transition temperature Tg as low as possible is preferred for the glass to be used in the press molding method. Particularly, in the case of the direct press method, the production cost can be lowered by the use of the optical glass having low glass transition temperature Tg, 540° C. or less for example, because the optical glass can be formed in the atmosphere and the production equipment can be simplified.

US 7,892,998 B2

OPTICAL GLASS AND OPTICAL ELEMENT

This application is based on Japanese Patent Application No. 2007-267627 filed on Oct. 15, 2007, in Japanese Patent Office, the entire content of which is hereby incorporated by reference.

TECHNICAL FIELD

The present invention relates to optical glass and an optical element composed of the optical glass, and particularly relates to optical glass suitable for press molding process and an optical element produced by pressing the optical glass on a mold.

BACKGROUND

Optical elements composed of various kinds of optical glass are widely used for optical pickup lenses for discs such as CD, DVD, BED and HD-DVD, and used for image pickup lenses installed in portable telephones. Recently, demand to the optical element composed of such the optical glass is rapidly grown accompanied with the fast spreading of optical-disc recorder/player and portable telephone with camera. Consequently, rising in the production efficiency and lowering in the cost of the optical element is required. Consequently, a press molding method becomes to be widely applied for producing such the optical element. According to such the method, the production process can be reduced compared to usual polishing method so that the optical element can be produced in shorter time and at lower cost.

The press molding method can be classified into a re-heating method and a direct press method. In the re-heating method, a gob preform or a polished perform in a shape which is resembles in the final shape of the product is prepared and the preform is re-heated at a temperature not lower than the yield point At of the glass and pressed to obtain the final shape of the product.

In the direct press method, molten glass is dropped from a glass melting tank through a dropping nozzle onto a mold which is previously heated at a temperature near the glass transition temperature Tg of the molten glass drop, and the molten glass drop is pressed into the shape of the final product before the molten glass drop is cooled and solidified. In this process, repetition of heating and cooling of the mold is not necessary and the final product of the optical element can be directly produced from the molten glass drop. Therefore, the time necessary for once formation of the product is very short. Thus, this method gets attention as a method by which the product efficiency higher than that of the re-heating method can be expected.

As described above, it is necessary to heat the mold to a temperature not lower than the yield temperature At of the glass in the re-heating method or to a temperature near the glass transition temperature Tg of the glass in the direct press method. Consequently, the degradation of the mold is easily accelerated and the life time of the mold is shortened when the yield temperature At or the glass transition temperature Tg of the glass is higher, which results in increase of the cost. Therefore, an optical glass having the yield temperature At or the glass transition temperature Tg as low as possible is preferred for the glass to be used in the press molding method. Particularly, in the case of the direct press method, the production cost can be lowered by the use of the optical glass having low glass transition temperature Tg, 540° C. or less for example, because the optical glass can be formed in the atmosphere and the production equipment can be simplified.

It is preferable that the optical glass does not contain PbO, $As_2O_3$, $TeO_2$ and fluoride considering the working environment at the production process and ensuring the safeness of workers.

Hitherto, some kinds of optical glass having high refractive index, high dispersion and low glass transition temperature Tg have been proposed; cf. JP-A Nos. 2005-306733 and 2006-131480 for example.

However, there has been a problem that clouding appears on the optical surface of the produced optical element when the pressing is repeatedly carried out in the direct press method using the optical glasses described in JP-A Nos. 2005-306733 and 2006-131480.

It is supposed that the clouding is caused by that the slight amount of the glass composition adheres onto the mold when the mold is directly contacted to the molten glass drop and the adhering composition re-adheres onto the surface of the next produced optical element. When the pressing process is further repeated, there has been a problem that the surface roughness of the mold is raised by the adhering material and is transferred to the optical element so that the surface roughness of the optical element is raised.

Moreover, there has further been the problem that the clouding also appears on the surface of the optical element by repeating the pressing process in the case of using such the optical glass also in the re-heating method.

SUMMARY

The invention is achieved in view of the above technical background and an object of the invention is to provide optical glass suitable for producing the optical element by the press molding method, which has optical constants of high refractivity and high dispersion and hardly causes the clouding on the optical element when the pressing processes are repeatedly performed. Another object of the invention is to provide an optical element composed of such the optical glass which can be produced by the press molding method with high production efficiency and at lowered cost.

An embodiment of the present invention is an optical glass comprising, based on a total weight of the optical glass: 15 to 40 weight percent of $P_2O_5$; 0 to 10 weight percent of $Li_2O$; 0 to 20 weight percent of $Na_2O$; 0 to 20 weight percent of $K_2O$; more than 2 weight percent and not more than 15 weight percent of $TiO_2$; 0 to 15 weight percent of CaO; 0 to 32 weight percent of BaO; 0 to 20 weight percent of SrO; 0 to 15 weight percent of ZnO; not less than 0 weight percent and less than 3 weight percent of $Bi_2O_3$; 0 to 50 weight percent of $Nb_2O_5$; not less than 0 weight percent and less than 20 weight percent of $WO_3$; and 0 to 1 weight percent of $Sb_2O_3$. In the optical glass, a total weight of $Li_2O$, $Na_2O$ and $K_2O$ is in a range of 3 to 30 weight percent based on the total weight of the optical glass, and the optical glass does not comprise $B_2O_3$.

These and other objects, features and advantages according to the present invention will become more apparent upon reading of the following detailed description along with the accompanied drawings.

BRIEF DESCRIPTION OF THE DRAWING

Embodiments will now be described, by way of example only, with reference to the accompanying drawings which are meant to be exemplary, not limiting, and wherein like elements numbered alike in several Figures, in which:

Each of FIGS. 1(a) and 1(b) shows a schematic drawing of the forming apparatus used in Examples.

DESCRIPTION OF PREFERRED EMBODIMENT

Figure 1:
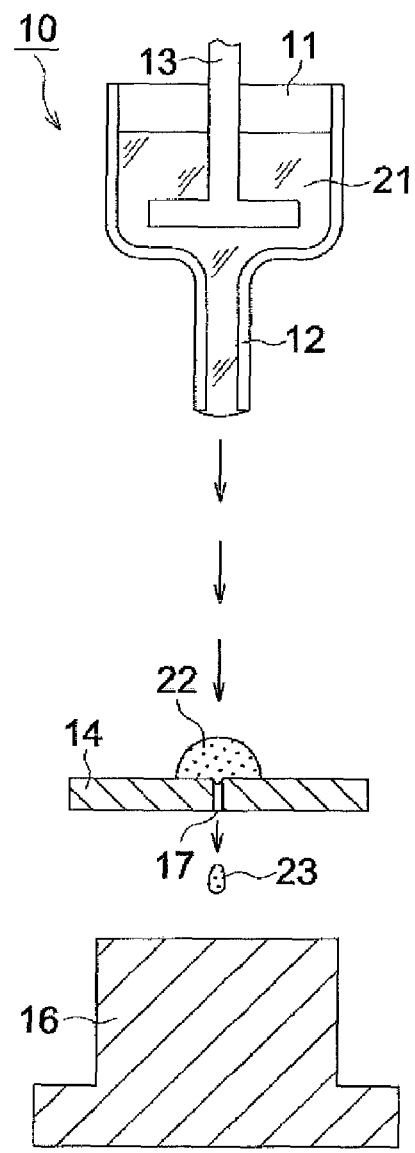
Figure 1:
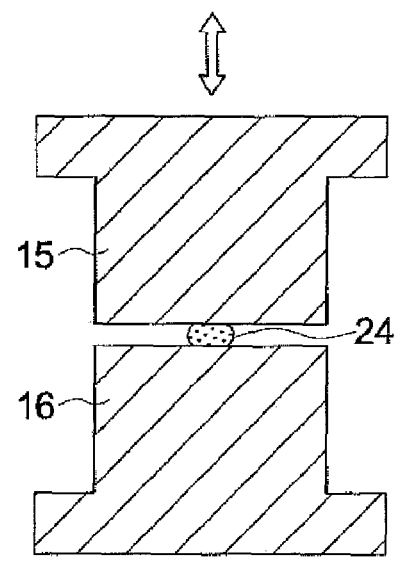

The optical glass of a preferred embodiment of the invention containing the predetermined constituents has optical constants of high refractivity and high dispersion and low glass transition temperature Tg and the clouding on the optical element hardly appears. Consequently, the optical element can be produced with high production efficiency and low cost by the press molding method, particularly by the direct press method.

As a result of investigation by the inventors, it is found that the occurrence of the clouding can be inhibited by the use of optical glass not containing $B_2O_3$. It is supposed that such the effect can be caused by that the composition of the optical glass difficultly adheres onto the mold when the molten glass drop is contacted to the mold since the glass does not contain $B_2O_3$. As a result of further investigation based on the above finding, it is found that a $P_2O_5$—$TiO_2$-Alkali metal oxide type glass having the specified ratios of the constituents inhibits the occurrence of the clouding in the optical glass and provides an optical glass having the optical constants of high refractivity and high dispersion and being suitable for producing the optical element by the press molding method.

The optical glass of the embodiment containing the constituents in the specified ratios has the optical constants of a refractive index nd of from 1.7 to 2.0, an Abbe number vd of from 16 to 32 and a glass transition temperature Tg of not more than 540° C. The optical glass has a property that the clouding is hardly appears even when the pressing processes are repeatedly performed. There is no problem in the safeness of the production process because the optical glass does not contain PbO, $As_2O_3$, $TeO_3$ and the fluorine compound. Therefore, the optical element can be produced by the press molding method using the optical glass of the embodiment with high production efficiency and at low cost.

(Composition of Glass)

The reason of deciding the foregoing quantities of constituents of the glass, which is based on a total weight of the optical glass, is described in detail below.

When $B_2O_3$ is contained in the glass, the glass considerably tends to adhere to the mold so as to cause the clouding on the optical element by repeatedly pressing the glass. Therefore, $B_2O_3$ is not contained in the glass of the embodiment. However, slight amount of $B_2O_3$ such as the amount contained in other raw material as impurity is allowed. In such the case, the content of $B_2O_3$ is preferably less than 1,000 ppm, more preferably less than 700 ppm, in weight ratio.

$P_2O_5$ is a glass forming oxide and the refractive index nd is lowered when the content of $P_2O_5$ exceeds 40 weight percent, and the glass tends to be devitrified when the content is less than 15 weight percent. Accordingly, the content of $P_2O_5$ should be within the range of from 15 to 40 weight percent and the content of from 20 to 36 weight percent is preferable.

$Li_2O$, $Na_2O$ and $K_2O$ as the $R_2O$ (alkali metal oxide) component, each shows the effects of lowering the glass transition temperature Tg, inhibiting the devitrification and being vitrified at relatively low temperature. However, such the effects are insufficient when the total content of $R_2O$ components is less than 3 weight percent, and the glass tends to be devitrified when the content is exceeds 30 weight percent. Therefore, the total content of the $R_2O$ components ($Li_2O$, $Na_2O$ and $K_2O$) is necessarily within the range from 3 to 30 weight percent. The range is more preferably from 5 to 20 weight percent.

The durability of the glass is lowered when the content of $Li_2O$ exceeds 10 weight percent. Consequently, the content of $Li_2O$ is within the range from 0 to 10 (including 0) weight percent. The refractive index nd of the glass is lowered when each of the content of $Na_2O$ and $K_2O$ exceeds 20 weight percents Consequently, the contents of $Na_2O$ and $K_2O$ are each within the range of from 0 to 20 (including 0) weight percent, respectively.

$TiO_2$ is an essential component for obtaining the objective optical constants of high refractivity and high dispersion and has effects of inhibiting devitrification and of stabilizing the glass. However such the effects are insufficient when the content of $TiO_2$ is 2 weight percent or less, and the glass tends to be colored and the glass transition temperature is raised when the content exceeds 15 weight percent. Accordingly, the content of $TiO_2$ is necessarily more than 2 weight percent and not more than 15 weight percent.

CaO has effects of increasing the refractive index nd and lowering the glass transition temperature Tg. However, the glass becomes instable when the content of CaO exceeds 15 weight percent. Consequently, the content of CaO is necessarily within the range of from 0 to 15 (including 0) weight percent. The content within the range from 0 to 10 (including 0) weight percent is more preferable.

BaO has effects of increasing the refractive index nd and stabilizing the glass. However, the property of high dispersion is difficultly maintained when the content of BaO exceeds 32 weight percent. Consequently, the content of BaO is necessarily within the range of from 0 to 32 (including 0) weight percent.

SrO has effects of raising the refractive index nd and to stabilizing the glass similar to BaO. However, the glass tends to be devitrified when the content of SrO exceeds 20 weight percent. Consequently, the content of SrO is necessarily within the range of from 0 to 20 (including 0) weight percent.

ZnO has effects of raising the refractive index nd and to lowering the glass transition temperature of the glass. However, the glass tends to be devitrified when the content of ZnO exceeds 15 weight percent Consequently, the content of ZnO is necessarily within the range of from 0 to 15 (including 0) weight percent.

$Bi_2O_3$ shows effects of raising the refractive index nd, giving high dispersion property, lowering the glass transition temperature Tg and inhibiting devitrification of the glass. However, the constituents of the glass tend to adhere to the mold when the content of $Bi_2O_3$ is 3 weight percent or more. Therefore, the content of $Bi_2O_3$ is necessarily within the range of not less than 0 weight percent (including 0 and less than 3 weight percent.

$Nb_2O_5$ has effects of raising the refractive index nd of the glass, giving high dispersion property and improving the durability of the glass. However, the glass tends to be devitrified and the glass transition temperature Tg of the glass is raised when the content of $Nb_2O_5$ exceeds 50 weight percent. Therefore, the content of $Nb_2O_5$ is necessarily within the range from 0 to 50 (including 0) weight percent, more preferably from 0 to 40 (including 0) weight percent.

$WO_3$ shows effects of raising the refractive index nd of the glass, giving the high dispersion property and lowering the glass transition temperature of the glass. However, the glass tends to adhere to the mold when the content of $WO_3$ is 20 or more weight percent. Therefore, the content of $WO_3$ is necessarily within the range not less than 0 weight percent and less than 20 weight percent (including 0), more preferably with in the range from 0 to 18 (including 0) weight percent.

$Sb_2O_3$ can be used for debubbling and inhibiting coloration. The content of $Sb_2O_3$ in the optical glass of the embodiment is within the range from 0 to 1 (including 0) weight percent.

It is preferable that the optical glass of the embodiment does not contain constituents other than the above mentioned such as $SiO_2$, $MgO$, $Y_2O_3$, $Al_2O_3$, among constituents usually used for optical glass. However, the presence of these constituents in small amounts is allowed as long as that the property of the optical glass is not influenced by them. In such the case, the total content of $P_2O_3$, $Li_2O$, $Na_2O$, $K_2O$, $TiO_2$, $CaO$, $BaO$, $SrO$, $ZnO$, $Bi_2O_3$, $Nb_2O_5$, $WO_3$ and $Sb_2O_3$ is preferably not less than 95 weight percent and more preferably not less than 98 weight percent.

It is preferable for ensuring the safeness of workers that the optical glass does not contain $PbO$, $As_2O_3$, $TeO_2$ and a fluorine compound.

(Press Molding)

The optical element of the embodiment is produced by forming the foregoing optical glass by a press molding process and is usable as the optical pickup lenses for discs such as CD and DVD, image pickup lens to be installed in digital cameras or portable telephones, collimating lens for a device such as a laser beam printer, and various mirrors and prisms. The optical element can be produced by the press molding method with high production efficiency and at low cost because the optical glass of the embodiment has properties suitable for the press molding method.

The optical element may be produced by either of a reheating method and a direct press method as the press molding method. However, the optical element can be produced by the direct press method with especially good productivity. A producing method of an optical element formed of the optical glass of the embodiment will be described below, taking the direct press method as an example.

The direct press method is a method in which a molten glass drop is dropped from a glass melting tank through a dropping nozzle onto a mold previously heated at a designated temperature and is pressed for forming into the shape of final product before the drop is cooled and solidified.

The mold is previously heated for suitably transferring the optical surface to the body of the optical element. The temperature is usually set near the glass transition temperature Tg of the optical glass, for example from Tg−50° C. to Tg+50° C., though the temperature is differed depending on the various conditions such as the shape and size of the optical element body. Accordingly, it is necessary that the heating temperature of the mold is raised accompanied with rising in the glass transition temperature Tg of the optical glass so that the deterioration of the mold is accelerated. The glass transition temperature of the optical glass is preferably as low as possible from the view point of inhibition of the deterioration of the mold. The glass transition temperature Tg of the optical glass of the embodiment is very low such as not more than 540° C. Therefore, the deterioration of the mold can be effectively inhibited and the optical element can be produced with high production efficiency.

The material of the mold can be selected from known materials for a mold for press-molding an optical element composed of glass, for example, a heat resistive alloy such as stainless steel, an ultra hard material principally composed of tungsten carbide, various ceramics such as silicone carbide, silicone nitride and aluminum nitride and a composite material containing carbon. Molds having a protective layer formed by various metals, ceramics or carbon on the surface thereof can also be used.

The drop of molten glass is naturally released and dropped from the dropping nozzle when the weight of the molten glass accumulated at the top of the nozzle is reached at a designated value. Usually, a drop of about 0.1 to 2 g can be dropped.

The molten glass drop may be dropped from the dropping nozzle, not directly dropped onto the mold, and hit to a member having a fine through hole so that a part of the molten glass drop is passed through the fine through hole to form a fine droplet and dropped onto the mold. A fine optical element in weight from 0.001 to 0.5 g can be produced by such the method. Such the method is preferable because many kinds of optical element can be produced at high efficiency since the volume of the molten glass drop can be controlled by changing the diameter of the fine through hole without changing of the dropping nozzle. This method is described in JP-A No. 2002-154834.

The molten glass drop dropped onto the mold is formed into an element body of the optical element by pressing the drop by the pair of upper and lower molds. The molten glass drop is rapidly cooled and solidified into the body of the optical element during pressing the drop by the molds with being cooled through the contacting surface with the molds. The pressure and the time for the pressing may be suitably decided according to the size of the optical element to be produced. Usually, the pressure for pressing about from 200 to 6,000 N and the pressing time from several seconds to several tens seconds are suitable.

EXAMPLES

The above embodiment is described in detail below referring examples. The present invention is not limited to the examples.

Seven kinds of optical glass (Examples 1 to 7) each having the composition within the range of the embodiment and two kinds of optical glass (Comparative Examples 1 and 2) each having the composition out of the range of the embodiment were prepared. The glass compositions of Examples 1 to 7 and those of Comparative Examples 1 and 2 are each listed in Table 1 and Table 2. The Comparative Example 1 was tracing of Example 29 described in JP-A No. 2005-306733 and Comparative Example 2 was that of Example 5 described in JP-A No. 2006-131480.

TABLE 1

| | | Example 1 | Example 2 | Example 3 | Example 4 | Example 5 | Example 6 | Example 7 |
|---|---|---|---|---|---|---|---|---|
| Glass composition | $P_2O_5$ | 26.5 | 35.0 | 26.5 | 33.0 | 26.5 | 27.8 | 26.4 |
| | $B_2O_3$ | 0 | 0 | 0 | 0 | 0 | 0 | 0 |
| | $Li_2O$ | 4.0 | 3.8 | 5.5 | 3.8 | 4.0 | 3.3 | 3.8 |
| | $Na_2O$ | 5.5 | 8.5 | 0 | 5.5 | 5.5 | 5.5 | 5.5 |
| | $K_2O$ | 2.9 | 0.8 | 4.3 | 0.8 | 3.0 | 1.0 | 0.8 |
| | $Li_2O +$ $Na_2O +$ $K_2O$ | 12.4 | 13.1 | 9.8 | 10.1 | 12.5 | 9.8 | 10.1 |
| | $CaO$ | 1.8 | 0 | 4.5 | 0 | 9.3 | 2.0 | 0 |

TABLE 1-continued

|  |  | Example 1 | Example 2 | Example 3 | Example 4 | Example 5 | Example 6 | Example 7 |
|---|---|---|---|---|---|---|---|---|
|  | BaO | 0 | 0 | 7.7 | 8.4 | 0 | 29.1 | 9.3 |
|  | SrO | 0 | 0 | 0 | 0 | 0 | 0.8 | 0 |
|  | ZnO | 0 | 0 | 0 | 2.0 | 0 | 0 | 4.0 |
|  | $TiO_2$ | 9.7 | 8.3 | 4.2 | 2.9 | 3.5 | 11.1 | 3.1 |
|  | $Bi_2O_3$ | 2.2 | 0 | 1.7 | 0 | 1.4 | 0 | 0 |
|  | $Nb_2O_5$ | 30.8 | 43.6 | 28.1 | 43.6 | 30.8 | 0 | 31.5 |
|  | $WO_3$ | 16.5 | 0 | 17.5 | 0 | 16.0 | 19.3 | 15.6 |
|  | $Sb_2O_3$ | 0.1 | 0 | 0 | 0 | 0 | 0.1 | 0 |
|  | (Total amount) | 100.0 | 100.0 | 100.0 | 100.0 | 100.0 | 100.0 | 100.0 |
| Physical value | nd | 1.85593 | 1.80733 | 1.81059 | 1.79265 | 1.79240 | 1.73578 | 1.81406 |
|  | vd | 21.9 | 23.1 | 25.8 | 25.6 | 26.6 | 31.5 | 25.2 |
|  | Tg (° C.) | 493 | 521 | 478 | 482 | 464 | 456 | 466 |
| Clouding | $300^{th}$ | A | A | A | A | A | A | A |
|  | $600^{th}$ | A | A | A | A | A | A | A |

TABLE 2

|  |  | Comparative Example 1 | Comparative Example 2 |
|---|---|---|---|
| Glass composition | $P_2O_5$ | 23.7 | 24.5 |
|  | $B_2O_3$ | 1.6 | 6.0 |
|  | $Li_2O$ | 3.6 | 5.0 |
|  | $Na_2O$ | 8.5 | 0 |
|  | $K_2O$ | 5.7 | 0 |
|  | $Li_2O + Na_2O + K_2O$ | 17.8 | 5.0 |
|  | CaO | 0 | 0 |
|  | BaO | 0 | 14.5 |
|  | SrO | 0 | 0 |
|  | ZnO | 0 | 0 |
|  | $TiO_2$ | 3.0 | 2.0 |
|  | $Bi_2O_3$ | 0 | 3.0 |
|  | $Nb_2O_5$ | 36.3 | 29.0 |
|  | $WO_3$ | 17.6 | 16.0 |
|  | $Sb_2O_3$ | 0 | 0.03 |
|  | (Total amount) | 100.0 | 100.03 |
| Physical value | nd | 1.80851 | 1.8109 |
|  | vd | 23.5 | 26.37 |
|  | Tg(° C.) | 446 | 492 |
| Clouding | $300^{th}$ | B | B |
|  | $600^{th}$ | B | B |

Usual powdered raw materials of glass such as oxides, carbonates, nitrates and phosphates were satisfactorily mixed to prepare a mixed glass material with the glass composition listed in the Tables 1 and 2. The mixed glass material was put into a melting tank heated at a temperature of from 900° C. to 1,300° C. and melted, cleaned and unified by stirring and then molded into a previously heated iron mold and gradually cooled to prepared samples.

Thus prepared samples were each subjected to measurement of refractive index nd for helium d-line (wavelength: 587.56 nm), Abbe number vd and glass transition temperature Tg. Measured results are listed in Table 1 and 2.

The refractive index nd, Abbe number vd and glass transition temperature Tg were measured according to the testing method prescribed in Japanese Optical Glass Industrial Standards (JOGIS). The refractive index nd and the Abbe number vd were measured after the glass block is molded as described above and is gradually cooled to the room temperature (25° C.) at a cooling rate of −50° C. per hour. The measurements were carried out by using a measuring apparatus KPR-200 manufactured by Kalnew optical Industrial Co., Ltd. The glass transition temperature Tg was measured by a thermo-mechanical analyzer TMA/SS6000 manufactured by Seiko Instruments Inc. at a temperature rising rate of 10° C. per minute.

Optical elements having a plane shape on the both sides were prepared by using each of the optical glasses, by the direct press method. FIGS. 1(a) and 1(b) show a schematic drawing of the forming apparatus 10 used for preparation of the samples. FIG. 1(a) shows a situation of dropping the molten glass drop and FIG. 1(b) shows a situation of pressing the molten glass drop.

The molten glass 21 in the melting tank 11 was stirred and uniformed by a stirrer stick 13. The molten grass drop was naturally released and fallen when the weight of the molten glass accumulated at the end of the dropping nozzle 12 amounted to the designated value. The molten glass drop 22 fallen from the dropping nozzle 12 was struck to a plate 14 having a fine through hole 17. A part of the molten glass drop 22 passed the fine through hole 17 and formed a fine molten glass drop 23. The fine molten glass drop 23 was dropped onto a lower mold 16 as shown in FIG. 1(a). Then, the molten glass drop 23 was pressed between the upper mold 15 and the lower mold 16 to prepare an optical element 24 as shown in FIG. 1(b).

Six hundreds optical elements were prepared per each of the Examples 1 to 7 and Comparative Examples 1 and 2, and the appearance of clouding on a surface of the $300^{th}$ prepared sample and the $600^{th}$ prepared samples was evaluated. The clouding was evaluated by visual observation and the sample without clouding and that with clouding were ranked into A and B, respectively. Evaluated results are listed in Table 1 and 2.

As shown in Table 1, the optical glass of Examples 1 to 7 each has a refractive index nd within the range from 1.7 to 2.0 and an Abbe number vd within the range of from 16 to 32. Moreover, the glass transition temperature of each of the samples was not more than 540° C. and clouding did not appear after pressing the $600^{th}$ optical elements. Accordingly, it was confirmed that the optical elements could be produced with high production efficiency by the press molding method.

In contrast, the clouding appeared on the optical elements after pressing the $300^{th}$ optical elements using the optical glasses of Comparative Example 1 and 2 as shown in Table 2.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical glass comprising, based on a total weight of the optical glass:
   15 to 40 weight percent of $P_2O_5$;
   0 to 10 weight percent of $Li_2O$;
   0 to 20 weight percent of $Na_2O$;
   0 to 20 weight percent of $K_2O$;
   more than 2 weight percent and not more than 15 weight percent of $TiO_2$;
   0 to 15 weight percent of CaO;
   0 to 32 weight percent of BaO;
   0 to 0.8 weight percent of SrO;
   0 to 4 weight percent of ZnO;
   0 to less than 3 weight percent of $Bi_2O_3$;
   0 to 31.5 weight percent of $Nb_2O_5$;
   0 to less than 20 weight percent of $WO_3$; and
   0 to 1 weight percent of $Sb_2O_3$,
   wherein a total weight of $Li_2O$, $Na_2O$ and $K_2O$ is in a range of 3 to 30 weight percent based on the total weight of the optical glass,
   the optical glass does not comprise $B_2O_3$, $SiO_2$, $Al_2O_3$, and MgO, and
   a glass transition temperature Tg of the optical glass is not higher than 540° C.

2. The optical glass of claim 1,
   wherein the optical glass does not comprise PbO, $As_2O_3$, $TeO_2$, and fluoride.

3. The optical glass of claim 1,
   wherein a refractive index nd of the optical glass is in a range of 1.7 to 2.0, and
   an Abbe number νd of the optical glass is in a range of 16 to 32.

4. An optical element comprising an element body comprising the optical glass of claim 1.

5. An optical element of claim 4,
   wherein the element body is formed by pressing a drop of the optical glass which is melt and dropped on a mold.

* * * * *